L. DERBY.
Improvement in Thill Couplings.
No. 122,760. Patented Jan. 16, 1872.
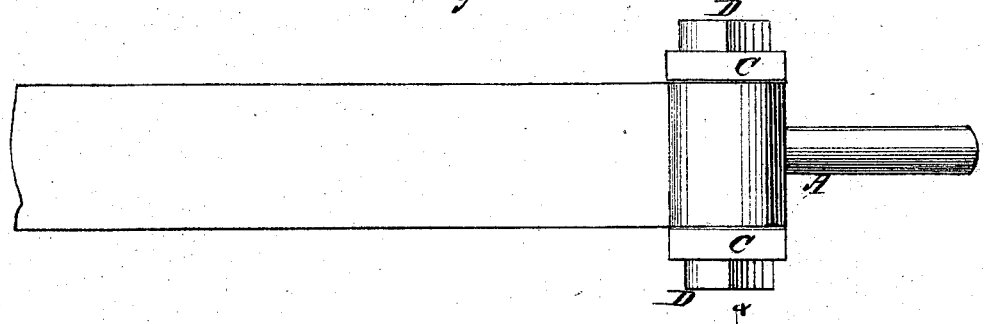
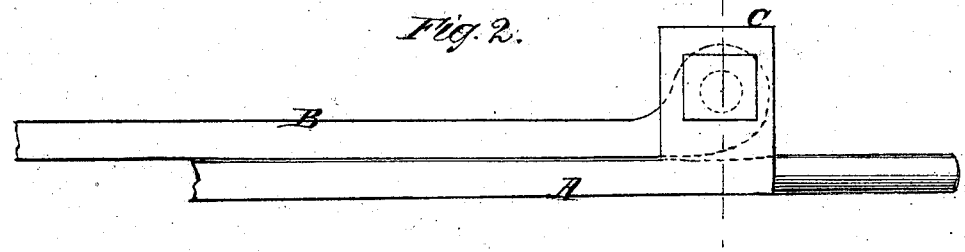
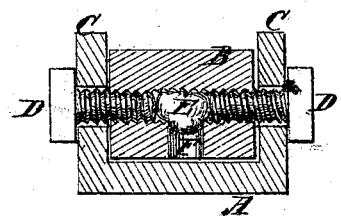

UNITED STATES PATENT OFFICE.

LYMAN DERBY, OF FRANCONIA, NEW HAMPSHIRE.

IMPROVEMENT IN THILL-COUPLINGS.

Specification forming part of Letters Patent No. 122,760, dated January 16, 1872.

*To all whom it may concern:*

Be it known that I, LYMAN DERBY, of Franconia, in the county of Grafton and State of New Hampshire, have invented a new and useful Improvement in Mode of Tightening Thills and other Connections; and I do hereby declare that the following is a full, clear, and exact description thereof, which will enable others skilled in the art to make and use the same, reference being had to the accompanying drawing forming part of this specification.

My invention pertains to improvement in the class of thill-couplings in which rubber or other suitable elastic substance is employed to prevent rattling. The invention consists in the construction and arrangement of parts as specifically stated in the claim, whereby provision is made for causing the two coupling-screws to retain a secure hold, under all circumstances, by a single block or piece of rubber inserted between their adjacent inner ends; special provision being made for expansion of the rubber or compression of the same without material change in its elastic force, as applied to or exerted upon the screws, so that, if the block of rubber should be of undue size or firmness, the screws may notwithstanding be easily screwed home without injury to the rubber.

In the accompanying drawing, Figure 1 is a top, and Fig. 2 a side view of my invention, applied; and Fig. 3 is a cross-section of Fig. 2 taken on the line *x x*.

Similar letters of reference indicate corresponding parts.

A represents the part which is attached to the axle of the vehicle. B is attached to the thill. The thill-piece is curved upward and has an eye, as seen in dotted lines in Fig. 2, and the piece A has ears C C with holes to correspond with the eye.

The thill is usually fastened by passing a bolt through the holes and the eye. Instead of a single bolt I use two screws, D D, which pass through the ears and screw into the eye, as seen in Fig. 3. In the eye and between the ends of the screws I place a piece of rubber, or other elastic substance, E, which is compressed as the screws are turned, and which, by its elasticity or recoiling force, prevents the screw from working loose and the connection from rattling.

F is a hole, from the eye of B, which receives the surplus rubber, should there be too much rubber placed in the eye. Thus, by reason of the cavity provided for reception of the surplus rubber, the elastic force exerted on the screws will always be more nearly equal than it would otherwise be, permitting them to be readily screwed to their places even if the rubber be of much too great length, without compressing it so as to cause it to lose practically the degree of elasticity requisite to proper performance of its function.

Having thus described my invention I claim as new and desire to secure by Letters Patent—

In combination with the parts A, C, and B, the screws D, rubber block E, and hole F, arranged as shown and described.

LYMAN DERBY.

Witnesses:
   CHARLES EDSON,
   CHARLES F. EDSON. (31)